W. MORRISON.
MAIL BOX.
APPLICATION FILED NOV. 12, 1913.

1,146,896.

Patented July 20, 1915.
6 SHEETS—SHEET 1.

Witnesses
J. T. L. Wright
R. M. Smith

Inventor
William Morrison
By Victor J. Evans
Attorney

W. MORRISON.
MAIL BOX.
APPLICATION FILED NOV. 12, 1913.

1,146,896.

Patented July 20, 1915.
6 SHEETS—SHEET 5.

Witnesses
J. T. L. Wright
P. M. Smith

Inventor
William Morrison

By Victor J. Evans
Attorney

COLUMBIA PLANOGRAPH CO., WASHINGTON, D. C.

UNITED STATES PATENT OFFICE.

WILLIAM MORRISON, OF GEORGIANA, ALABAMA.

MAIL-BOX.

1,146,896.   Specification of Letters Patent.   Patented July 20, 1915.

Application filed November 12, 1913. Serial No. 800,556.

*To all whom it may concern:*

Be it known that I, WILLIAM MORRISON, a citizen of the United States, residing at Georgiana, in the county of Butler and State of Alabama, have invented new and useful Improvements in Mail-Boxes, of which the following is a specification.

This invention relates to automatic coin-controlled mail boxes, the object in view being to produce a mail box which is designed and constructed to receive mail matter such as letters, envelops, newspapers and other articles and impress thereon a stamp or printed representation of the same and of the proper denomination in accordance with the weight of the letter or other article, and then deliver the same into a suitable receptacle from which it may be subsequently extracted by an official of the post-office. The impression stamp is carried by a plunger, and the movements thereof are controlled by the introduction of coins of the proper denominations into the machine the construction of which prevents the operation of the stamping mechanism without the introduction of the proper coins therein.

With the above and other objects in view, the invention consists in the construction, combination and arrangement of parts, as will hereinafter be more fully illustrated, described and claimed.

In the accompanying drawings.

Figures 1, 2:
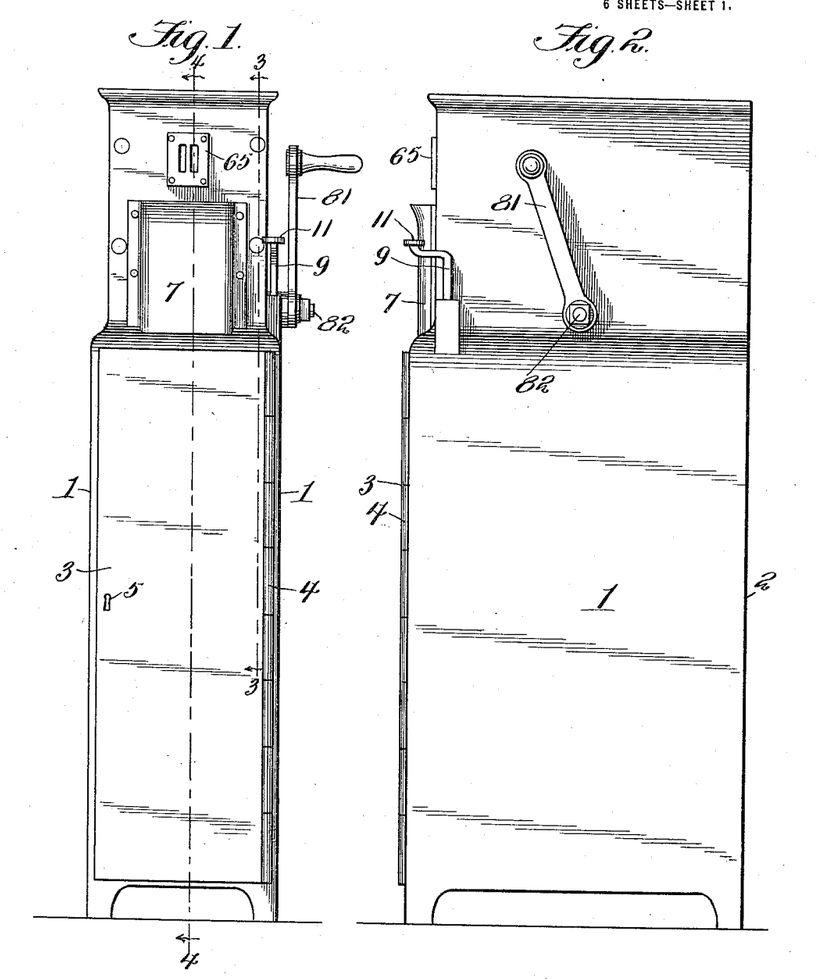
Figure 1 is a front elevation of a mail box embodying the present invention.
Fig. 2 is a side elevation thereof.

The mail box contemplated in this invention is illustrated in front and side elevation in Figs. 1 and 2, respectively, wherein it will be observed that said mail box embodies a substantially rectangular and vertically elongated casing embodying the oppositely located sides 1, back 2 and front 3, which consists of a door hinged as shown at 4 and provided with a key hole 5 leading to a lock 6 so as to give access to the contents of the cabinet by an official of the Post Office Department, the door 3 opening into that part of the cabinet which contains the mail receptacle and the coin box hereinafter referred to.

By reference to Figs. 1 and 2 it will be observed that just above the door 3 the cabinet is provided with a pocket 7 open at the top to permit letters and other mail matter to be inserted therein, the bottom of the pocket being closed by a trap door 8 housed within the cabinet so as to be inaccessible, said trap door being operated by a push rod 9 and lever 9′ normally upheld by a spring 10 which serves to keep the trap door 8 normally closed, the upper portion of said push rod 9 being offset in a forward direction so as to extend outwardly from the casing where it is provided with a push button 11. After the mail matter has been stamped by the mechanism hereinafter described, by pushing downwardly on the button 11, the trap door 8 is opened thereby allowing the mail matter to slide by gravity downwardly through a chute 12 into a mail receptacle having a draw pull 14 to facilitate its removal and insertion from the lower portion of the cabinet upon the opening of the door 3 as will be readily understood by reference to Fig. 4.

Figures 4, 18:
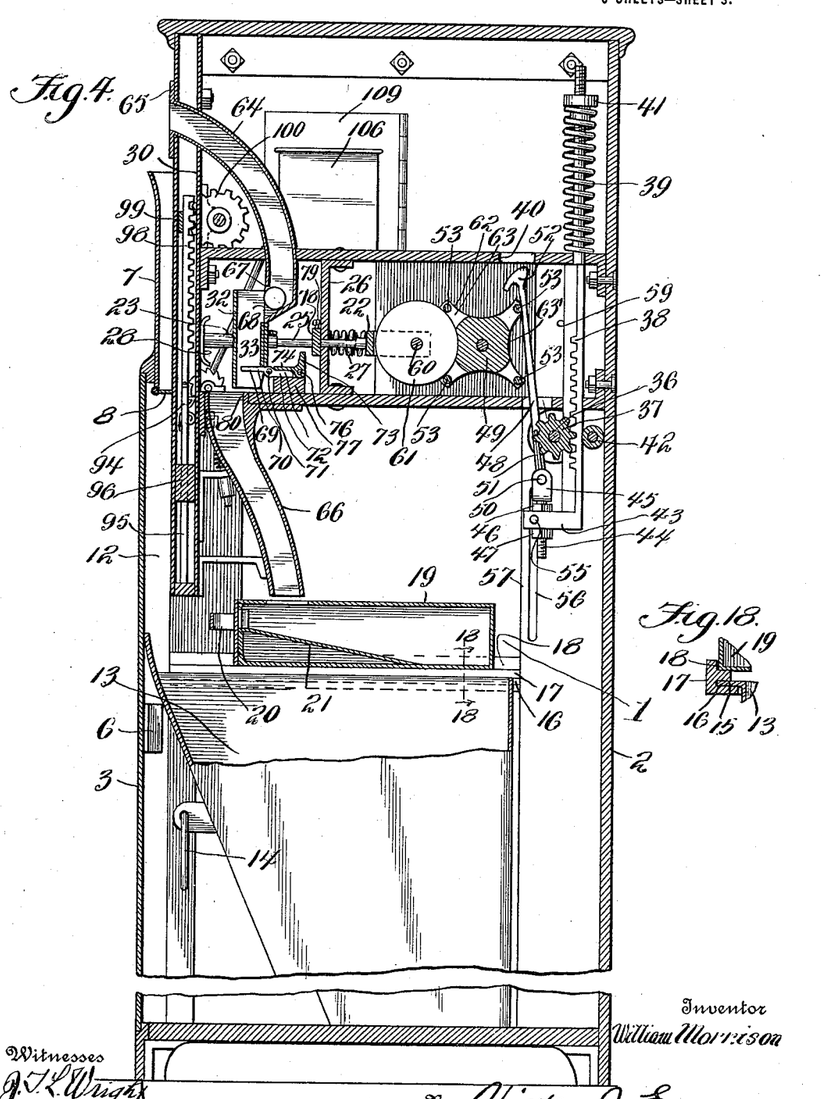
Fig. 4 is a vertical section on the line 4—4 of Fig. 1.
Fig. 18 is a detail horizontal section on the line 18—18 of Fig. 4.

As shown in Fig. 18, the mail receptacle 13 is provided along its opposite top edges with laterally projecting guide flanges 15 which are received in grooves 16 in cleats or guides 17 at opposite sides of the compartment in which the mail receptacle 13 is placed. The same cleats or guides 17 are rabbeted as shown at 18 to receive the opposite bottom corners of a coin box 19 also provided with a draw pull 20 to facilitate the removal thereof from the cabinet when the door 3 is opened. The coin box 19 is shown as provided with an inclined false floor 21 to prevent the accumulation of coins beneath the discharge end of the coin chute hereinafter more particularly described, the parts just referred to being clearly illustrated in Figs. 4 and 18.

Figure 7:
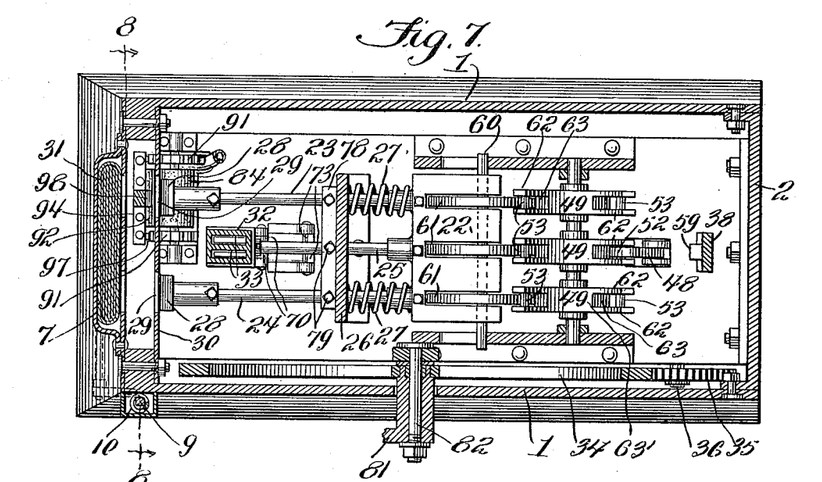
Fig. 7 is a horizontal section on the line 7—7 of Fig. 3.

The mechanism for imprinting a stamp or the representation of a stamp on the mail matter inserted in the pocket 7 comprises a plunger which as shown in Fig. 7 is composed of several parts, 22 designating the main body of the plunger which carries three plunger stems 23, 24 and 25, the said stems sliding through guide openings in a stationary guide 26. Plunger return springs 27 encircle the plunger stems 23 and 24 between the fixed guide 26 and the body 22 of the plunger, said springs being of the coiled expansion type and operating to thrust the plunger rearwardly or away from the pocket 7 at the front of the cabinet when the plunger is released by the mechanism hereinafter referred to.

Each of the stems 23 and 24 is provided at its forward end with a plunger head 28 which works through apertures 29 in a vertically extending plate 30 within the cabinet, said plunger heads being designed to press against the mail matter indicated at 31 in Fig. 7 at points equidistant from the center thereof for the purpose of distributing the pressure equally on said mail matter. Upon one of said plunger heads 28 is placed a stamp containing a suitable type surface in the form of type either of metal or rubber over which ink is spread by the means hereinafter described before the plunger is advanced to make its impression on the mail matter. The other plunger head, as above noted, is utilized to equalize the pressure on the mail matter and ordinarily no stamp or type will be carried thereby.

Figure 14:
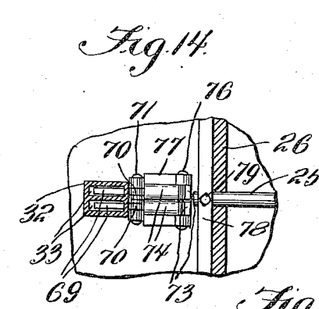
Fig. 14 is a detail horizontal section on the line 14—14 of Fig. 5.
Figure 15:
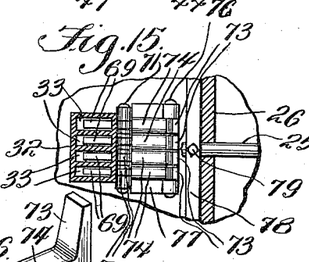
Fig. 15 is a similar section showing an increased number of trip dogs and latches.

The other plunger stem 25 carries a coin run-way 32 having a plurality of coin passages 33 as shown in Fig. 7 and also in the detail sections Figs. 14 and 15. In Figs. 7 and 14 only two of such passages are shown the same being designed to receive two pennies whereas in Fig. 15 four of such passages are shown to receive four pennies, the number of passages corresponding with the amount of postage to be indicated by the stamp on the cover, wrapper or envelop containing the mail matter. The cabinet illustrated in elevation in Figs. 1 and 2 is designed for only one weight of mail matter and constitutes a mail box unit. It will therefore be understood that any desired number of units may be employed in accordance with the various denominations of stamps required.

Figures 3, 17, 19:
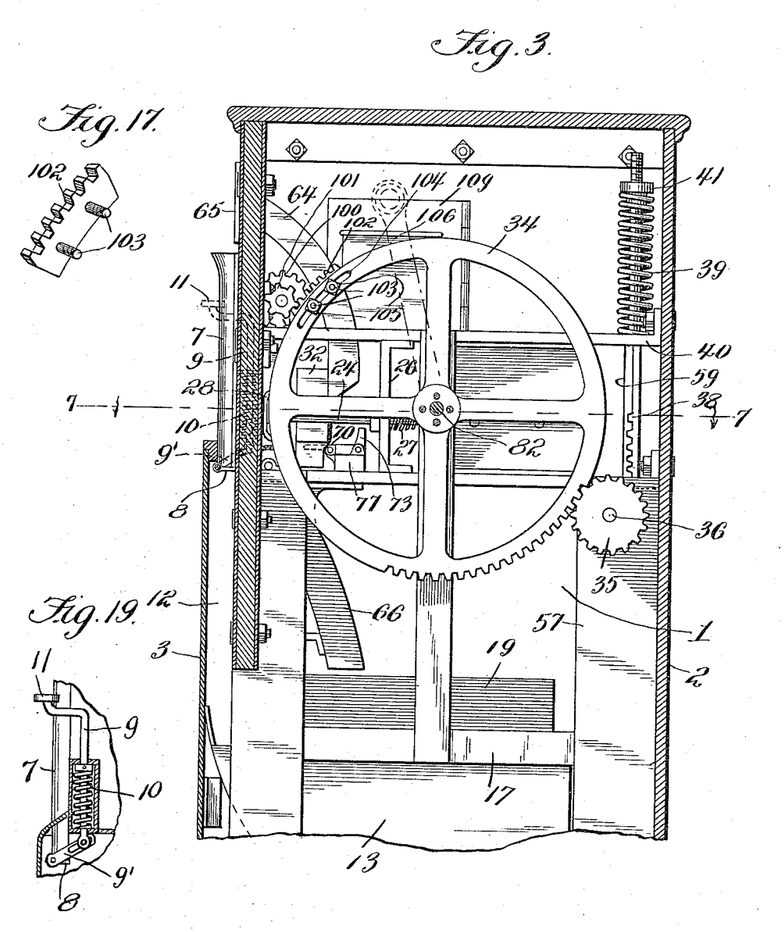
Fig. 3 is a vertical fore and aft section on the line 3—3 of Fig. 1.
Fig. 17 is a detail perspective view of the adjustable toothed segment.
Fig. 19 is a detail vertical section showing the trap door operating mechanism.

The plunger operating mechanism comprises a master wheel 34 of the spur gear type and mutilated as indicated in Fig. 3. Meshing with the fixed teeth of the wheel 34 is a spur pinion 35 on one end of a horizontal shaft 36 journaled in the cabinet, said shaft being provided at a point about centrally thereof with another pinion 37 which meshes with and actuates a vertically slidable rack bar 38 normally upheld and subsequently retracted in an upward direction by means of a coiled expansion spring 39 interposed between a fixed cross piece 40 within the cabinet and a shoulder 41 preferably in the form of a nut threaded on the upper end of the rack bar 38 so as to provide for adjusting the tension of said spring 39.

42 designates a roller for maintaining the mesh between the teeth of the pinion 37 and the teeth of the rack bar 38.

At its lower end the rack bar 38 is provided with a lateral extension or foot 43 through which is inserted the threaded stem 44 of a hook holding clip 45, adjusting nuts 46 and 47 being threaded on the stem 44 above and beneath the foot or extension 43 so as to provide for adjusting the plunger operating hook 48 up and down to give the desired throw to the pin wheel 49 in conjunction with which it operates as shown, for example in Fig. 4.

Figure 12:
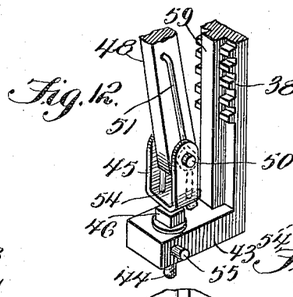
Fig. 12 is a detail perspective view showing the connection between the plunger operating hook and the actuating rack bar.
Figure 13:
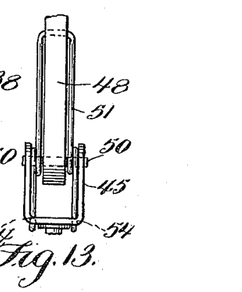
Fig. 13 is a detail elevation of said hook together with the actuating spring therefor and the pivot clip thereof.

By reference to Figs. 12 and 13 in connection with Fig. 4 the exact relationship between the hook and rack bar will be clearly understood, Fig. 12 illustrating the particular form of the clip 45 which, it will be observed, is forked to receive the lower end of the hook 48, the hook being pivotally connected with the clip 45 by means of a pin 50 or its equivalent. 51 designates a spring which operates to hold the hook 48 against the pin wheel to insure the engagement of the bill 52 of the hook with one of the pins 53 of the wheel 49. The spring 51 is shown as composed of wire bent into U-shape and inserted through the hook 48 while the terminals thereof are coiled around the pivot pin 50 and inserted through holes 54 in said clip to enable the spring to act with the desired pressure against the hook 48.

Figure 11:
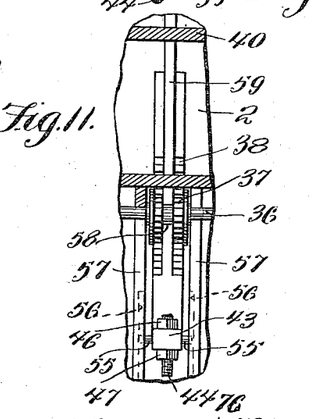
Fig. 11 is a detail vertical section on the line 11—11 of Fig. 10.

The foot or extension 43 of the rack bar is also provided with oppositely projecting guide pins 55 which work up and down in guide grooves 56 in the oppositely arranged parallel members 57 within the cabinet. The pinion 37 is formed as shown in Fig. 11 in which it will be observed that the central portion of the pinion is cut away or grooved at 58 to receive a guiding rib 59 on the adjacent face of the rack bar 38 thus insuring a smooth coöperation between said pinions and rack bar.

Figure 10:
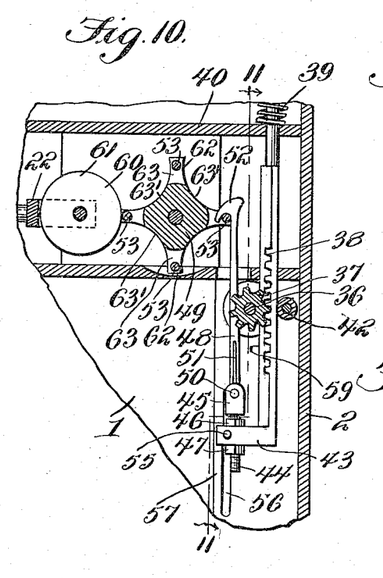
Fig. 10 is a detail vertical section on the same line as Fig. 4 showing the position of the hook and pin wheel when the plunger is advanced.

By reference to Fig. 7 it will be observed that the plunger body 22 carries a shaft 60 upon which are mounted three disk shaped wheels 61 which coöperate with a corresponding number of pin wheels 49. It will also be seen that each pin wheel 49 embodies a series of radiating arms 62 each of which is bifurcated or slotted as at 63 and crossed by one of the pins 53. Between the arms 62, the periphery or face of the wheel is concaved or cut out on an arc as shown at 63' to conform to the periphery of the coöperating disk or wheel 61 as clearly shown in Fig. 4. It will now be understood that when the hook 48 is pulled downwardly from the position illustrated in Fig. 4, this being the position of rest, to the position illustrated in Fig. 10, one of the pins 53 will operate against the periphery of the respective disk or wheel 61 and as all of the wheels 49 are simultaneously revolved through a portion of a circle, all of the wheels 61 will be simultaneously actuated thereby advancing the plunger and the several stems thereof toward the front of the cabinet temporarily overcoming the tension of the plunger returning springs 27. When the hook 48 has completed its downward movement, the wheels 49 resume the same relation to the wheels 61 as shown in Fig. 4, and the master wheel 34 having been turned backwardly by the pinion 35 under the action of the spring 39 on the rack bar 38, the hook 48 is also elevated to its initial position shown in Fig. 4 where it engages the next succeeding pin 53, the mechanism being then again in readiness for operation upon the insertion of another coin.

The mechanism for locking and releasing the plunger will now be described.

Figure 5:
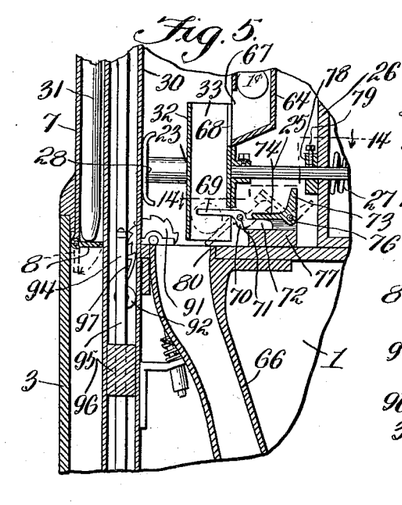
Fig. 5 is a detail vertical section taken on the same line as Fig. 4 showing an intermediate position of the dog and latch, as well as the plunger and coin runway carried thereby.
Figure 6:
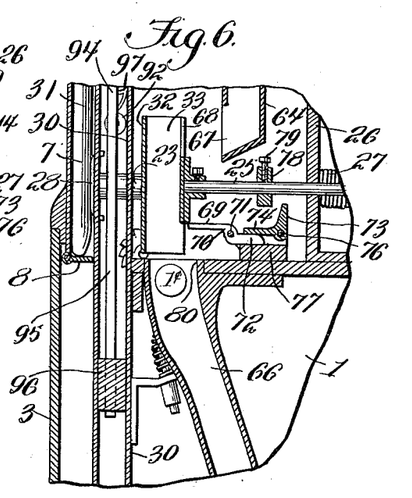
Fig. 6 is a similar section showing the second position of said parts.
Figure 9:
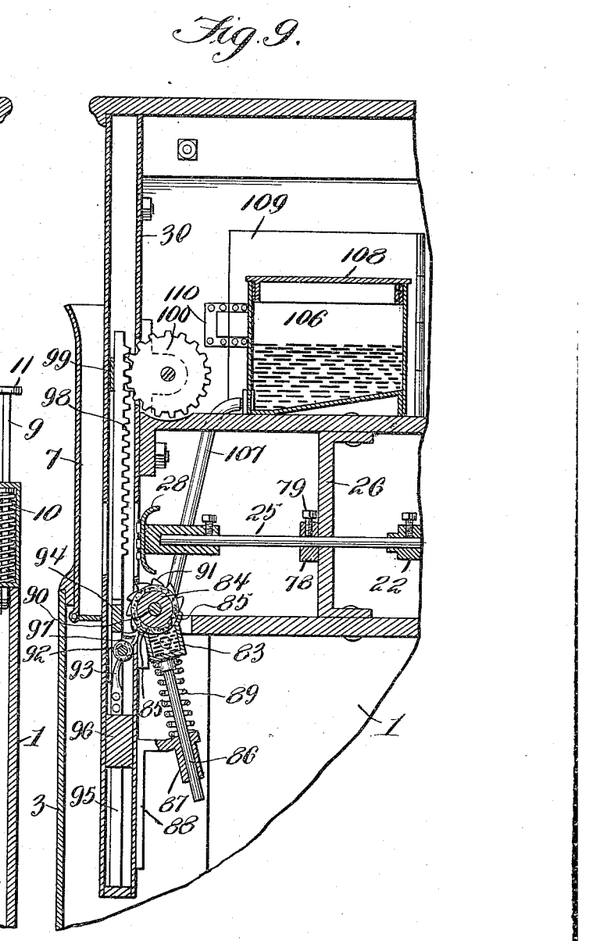
Fig. 9 is a vertical fore and aft section on the line 9—9 of Fig. 8.
Figure 16:
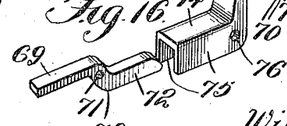
Fig. 16 is a detail perspective view of the dog and latch separated.

64 designates a plurality of coin chute upper sections (see Fig. 4) the receiving ends of which project through the front wall of the cabinet and also through a face plate 65 through which the coins are inserted into the chutes. A corresponding number of lower stationary chute sections 66 extend from a point just over the coin box 19 upwardly to a point close to the path of movement of the movable run-way 32. The stationary upper chute sections 64 are provided with laterally and forwardly facing discharge openings 67 permitting the coins to pass through lateral entrances 68 in the run-way 32 into the passages 33 of said run-way where they fall upon, and their movement is arrested by, the forwardly projecting portions 69 of a series of trip dogs 70 pivotally mounted intermediate their ends at 71 on a bracket 77, and provided with relatively heavy heel ends or extensions 72 which insure the return of the trip dogs to their normally horizontal positions indicated in Figs. 4, 5 and 6. As a corresponding number of dogs and latches is used in connection with each coin passage, a description of one set of dogs and latches will answer for all. By reference particularly to Figs. 5, 6 and 16 it will be noted that in connection with each trip dog 70 I employ a latch embodying an upstanding abutment portion 73 and a horizontal portion 74 having oppositely arranged downwardly extending flanges 75 which embrace the heel end or extension 72 of the dog, the latch being pivotally mounted at 76 at a point remote from the pivotal point of the dog 70 and both the dog and latch being pivotally supported by a bracket 77. Normally the abutment portion 73 of the latch stands in the path of a stop 78 fast on the central plunger stem 25 as shown in Fig. 9 and also rendered adjustable by means of a set screw 79 to bring said stop 78 into the desired relation to the latch abutment 73. The downward movement of the portion 69 of the trip dog is arrested by a shoulder 80 which as shown in Fig. 5 may consist of the upper extremity of the lower section 66 of the coin chute.

The operation of this part of the mechanism will now be clearly understood. A suitable number of coins of the proper denomination are inserted through the face plate 65 whereupon they gravitate downwardly in the upper chute sections 64, passing from thence into the passages 33 of the horizontally shiftable run-way 32. The coins then depress the trip dogs in the manner indicated in Fig. 5 but cannot escape from the run-way 32 until said run-way has been shifted horizontally from the position shown in Fig. 5 to the position shown in Fig. 6. When the dogs 70 tilt, however, the latches are correspondingly tilted on their pivots thereby throwing the abutment portions 73 out of the path of the stop 78. The operator then turns the handle 81 on the shaft 82 of the master wheel 34 in a counterclockwise direction (referring to Figs. 2 and 3), thereby advancing the plunger which is thus unlocked. As the run-way 32 advances, the coins therein fall through the sections 66 of the coin chute into the coin box 19. In the return movement of the plunger, the latches tilt to permit the stop 78 to pass by the same.

The mechanism for inking the stamp or type on the plunger head will now be described.

83 designates an ink cup or trough and 84 an ink supply roller which dips into the ink cup or trough 83, said cup or trough being arranged with oppositely arranged flanges 85 which press tightly against the surface of the roller, scraping off surplus ink and preventing the leakage of ink from the cup as shown in Fig. 9. The cup 83 is provided with a downwardly extending stem 86 passing through a guide 87 on a bracket 88, the cup being held elevated toward the roller 84 by means of a coiled expansion spring 89 surrounding the stem 86 as shown in Fig. 9, and interposed between said cup and bracket. The roller 84 is carried by a shaft 90 mounted in fixed bearings and at each end said roller is provided with ratchet teeth 91 to provide for turning the said ink supply roller.

Figure 8:
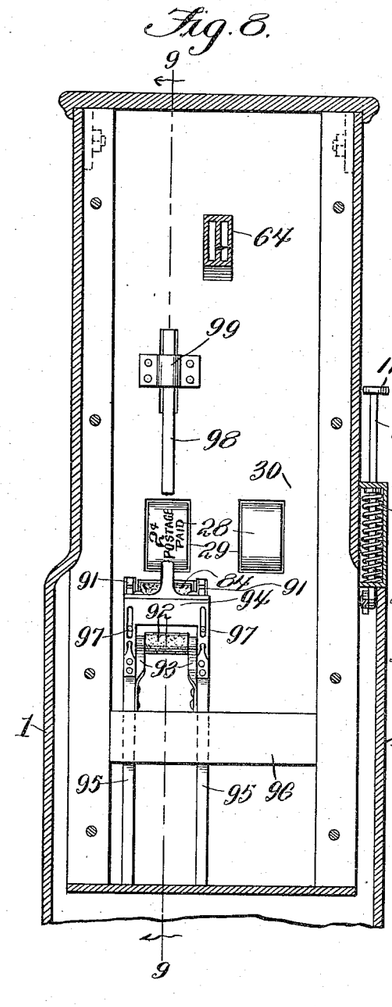
Fig. 8 is a vertical cross section on the line 8—8 of Fig. 7.

92 designates an inking roller which is journaled in the free ends of a pair of oppositely arranged springs 93 attached to a carrier 94 which is slidable vertically in the front of the cabinet. The carrier 94 comprises parallel downwardly extending guides 95 which are slidable through guide openings in a cross bar 96 forming part of the frame work of the cabinet as shown in Figs. 8 and 9. The springs 93 serve to press the roller 92 against the ink supply roller 84 as the carrier 94 move vertically. The carrier 94 is also provided with a pair of spring pawls 97 which in the upward movement of the carrier strike against the teeth 91 and impart a partial revolution to the roller 84 thereby bringing a freshly inked surface of said roller into contact with the inking roller 92. In the further upward movement of the carrier 94 the inking roller 92 passes across the type face of the plunger head thereby preparing the stamp for the succeeding impression.

The vertical movement of the carrier 94 is accomplished in the following manner: Extending upwardly from the carrier 94 is a rack bar 98 working through one or more guides 99 on the frame of the cabinet. Co-operating with said rack bar 98 is a pinion 100 fast on the same shaft with another pinion 101 which meshes with a toothed segment 102 adjustable along the rim of the master wheel 34 as illustrated in Figs. 3 and 17 wherein it will be observed that the segment 102 is provided with laterally projecting threaded stems 103 capable of being shifted lengthwise of a slot 104 in the rim of the master wheel and fastened by means of nuts 105. This adjustment of the segment 102 is desirable in order to obtain the proper relative movement of the carrier 94 with its inking roller 92 and the movement of the pinion 37 which controls the operation of the plunger. It will also be observed by reference to Fig. 4 that the pinion 100 is larger than the pinion 37 in order that the carrier may be shifted upwardly with a quicker movement than the movement imparted to the plunger by the pinion 37, so as to get the inking roller out of the way before the plunger starts forward.

An ink reservoir 106 is mounted within the cabinet at a higher elevation than the ink cup or trough 83 and has a pipe 107 leading therefrom to said trough as shown in Fig. 9. The reservoir 106 is provided with a removable cover 108 to permit filling the same and access is obtained to said reservoir through a door 109 fastened by means of a suitable lock 110.

From the foregoing description it will be now understood that the mechanism contained within the cabinet is normally locked and cannot be operated until coins of the proper number and of the proper denomination are introduced therein. When said coins are inserted in the cabinet, the latch mechanism is operated so as to release and unlock the plunger mechanism. The operator then moves the handle 81 in a counter-clockwise direction for a portion of a revolution of the master wheel 34. This wheel controls both the inking and plunger oper-operating mechanisms, the inking mechanism being operated with greater rapidity than the plunger mechanism so that the stamp is first inked and then thrust forward against the cover, wrapper or envelop of the mail matter which has previously been inserted in the exposed pocket 7 at the front of the cabinet. Upon releasing the operating handle 81, the entire mechanism is restored to its initial condition by the expansion of the springs 27 and 39, the plunger being locked by the latches which return to their initial positions by gravity. The operator then presses on the push button 11, thereby opening the trap door and permitting the mail matter to descend by gravity through the chute 12 into the main receptacle 13. In the forward movement of the coin run-way 32, the coins drop therefrom through the bottom portion of the chutes into the coin box 19.

It will be noted that the hook 48 in its initial position extends above the pin 53 as shown in Fig. 4. This permits the inking roller to move upwardly beyond the opening 29 in the plate 30 before the hook 52 begins to turn the wheel 49 and advance the stamp 28. The springs 93 will hold the inking roller against the plate 30 above the opening 29 until the operating handle 81 is released and then the toothed segment 102 will force said inking roller downward to its initial position.

What I claim is:

1. A mail box comprising a movable impression stamp, a plunger by which said stamp is carried, means for operating said plunger including a master wheel and pinion, an inking roller movable across said impression stamp, and means for shifting said roller embodying a carrier for said roller, rack and pinion mechanism for moving said carrier, and a toothed segment adjustable on the master wheel for actuating said rack and pinion mechanism.

2. A mail box comprising a movable impression stamp, a plunger by which said stamp is carried, means for operating said plunger including a master wheel and pinion, the plunger operating means embodying a slidable rack bar, a plunger actuating wheel, and a hook carried by said rack bar and engaging said wheel.

3. A mail box comprising a movable impression stamp, a plunger by which said stamp is carried, means for operating said plunger including a master wheel and pinion, the plunger operating means embodying a slidable rack bar, a plunger actuating wheel, a hook carried by said rack bar and engaging said wheel, and a spring for retracting said rack bar.

4. A mail box comprising a movable impression stamp, a plunger by which said stamp is carried, means for operating said plunger including a master wheel and pinion, said plunger operating mechanism including a wheel journaled on the plunger, another wheel carrying a pin coöperating with the first named wheel, a rack bar, and a hook carried by said rack bar and engaging the wheel which carries the plunger operating pin.

5. A mail box comprising a movable impression stamp, a plunger by which said stamp is carried, means for operating said plunger including a master wheel and pinion, said plunger operating mechanism including a wheel journaled on the plunger, another wheel carrying a pin coöperating with the first named wheel, a rack bar, a hook carried by said rack bar and engaging the wheel which carries the plunger operating pin, and means for adjusting said hook in relation to said rack bar and the wheel which carries the plunger operating pin.

6. A mail box comprising a movable impression stamp, a plunger by which said stamp is carried, means for operating said plunger including a master wheel and pinion, an inking mechanism for said stamp comprising a reciprocatory carrier, an inking roller carried thereby, an ink supply cup, an ink supply roller journaled on said cup, and means on the carrier for turning said ink supply roller.

7. A mail box comprising a movable impression stamp, a plunger by which said stamp is carried, means for operating said plunger including a master wheel and pinion, and means for inking said impression stamp comprising a reciprocatory carrier, an inking roller carried thereby, a spring sustained ink cup, an ink supply roller having its shaft journaled in fixed bearings, and means on the carrier for turning said ink supply roller.

8. A mail box comprising a movable impression stamp, a plunger by which said stamp is carried. means for operating said plunger including a master wheel and pinion, the plunger operating mechanism embodying a reciprocatory rack bar actuated by said master wheel, a pin carrying wheel coöperating with said plunger, a hook pivotally connected with said rack bar and engaging said pin carrying wheel, and a spring for pressing said hook toward said pin carrying wheel.

In testimony whereof I affix my signature in presence of two witnesses.

WILLIAM MORRISON.

Witnesses:
A. N. GLENN,
H. C. ZIEGLER.

Copies of this patent may be obtained for five cents each, by addressing the "Commissioner of Patents, Washington, D. C."